United States Patent
Kim (10) Patent No.: US 7,894,077 B2
(45) Date of Patent: Feb. 22, 2011

(54) MULTI-DIRECTIONAL PROJECTION TYPE MOIRE INTERFEROMETER AND INSPECTION METHOD OF USING THE SAME

(75) Inventor: Min Young Kim, Seoul (KR)

(73) Assignee: Koh Young Technology Inc., Seoul (KR)

( * ) Notice: Subject to any disclaimer, the term of this patent is extended or adjusted under 35 U.S.C. 154(b) by 413 days.

(21) Appl. No.: 11/947,381

(22) Filed: Nov. 29, 2007

(65) Prior Publication Data
US 2008/0278729 A1    Nov. 13, 2008

(30) Foreign Application Priority Data
May 8, 2007    (KR) ............... 10-2007-0044563

(51) Int. Cl.
G01B 9/02    (2006.01)
(52) U.S. Cl. .................. 356/521; 356/35.5
(58) Field of Classification Search ............... 356/499, 356/500, 511, 512, 521, 35.5
See application file for complete search history.

(56) References Cited

U.S. PATENT DOCUMENTS

| | | | | |
|---|---|---|---|---|
| 4,432,239 A | * | 2/1984 | Bykov | 73/800 |
| 4,850,693 A | * | 7/1989 | Deason et al. | 356/35.5 |
| 5,898,486 A | * | 4/1999 | Chesko et al. | 356/35.5 |
| 5,971,042 A | * | 10/1999 | Hartsell, Jr. | 141/198 |
| 6,522,777 B1 | * | 2/2003 | Paulsen et al. | 382/154 |
| 7,538,891 B1 | * | 5/2009 | Mello et al. | 356/520 |
| 2004/0105100 A1 | | 6/2004 | Shirley | 356/603 |
| 2008/0180693 A1 | * | 7/2008 | Dillon et al. | 356/521 |

FOREIGN PATENT DOCUMENTS

| | | |
|---|---|---|
| CN | 1748120 A | 3/2006 |
| JP | 56-125606 A | 10/1981 |
| JP | 2003-121120 A | 4/2003 |
| JP | 2003-519786 A | 6/2003 |
| JP | 2006-275529 A | 10/2006 |
| WO | 01/51886 A1 | 7/2001 |

OTHER PUBLICATIONS

Halioua, M., et al.; "Projection Moire with Moving Gratings for Automated 3-D Topography"; Applied Optics; Optical Society of America, Washington, D.C., vol. 22, No. 6, Mar. 15, 1983; New York, New York; pp. 850-855; (XP-001048526).
European Search Report dated Jun. 17, 2009.
Chinese Office Action dated Oct. 9, 2009.

* cited by examiner

*Primary Examiner*—Tarifur Chowdhury
*Assistant Examiner*—Jonathan M Hansen
(74) *Attorney, Agent, or Firm*—Kile Park Goekjian Reed & McManus PLLC (57) ABSTRACT

A multi-directional projection type moiré interferometer includes a stage, an image formation part, rotating mirrors, fixed mirrors, and a pattern illumination generating part. The stage moves a target object. The image formation part is provided above the stage to take a pattern image reflected from the target object placed on the stage. The rotating mirrors are vertically arranged and inclined at an angle different from each other to receive a pattern illumination, change the optical path of the pattern illumination, and emit the pattern illumination. The fixed mirrors emit the pattern illumination, emitted from the rotating mirrors, toward the target object. The pattern illumination generating part emits the pattern illumination toward the rotating mirrors. The pattern illumination generating part includes a grating board, and grating elements are formed at the grating board to emit the pattern illumination toward the rotating mirrors.

12 Claims, 8 Drawing Sheets

MULTI-DIRECTIONAL PROJECTION TYPE MOIRE INTERFEROMETER AND INSPECTION METHOD OF USING THE SAME

BACKGROUND

1. Field

The present invention relates to a multi-directional projection type moire interferometer and an inspection method of using the same, and more particularly, to a multi-directional projection type moire interferometer capable of multi-directionally emitting the pattern illumination toward a target object to eliminate a complex shadow area of the target object according to various shapes thereof, and an inspection method of using the same.

2. Background

Figure 1:
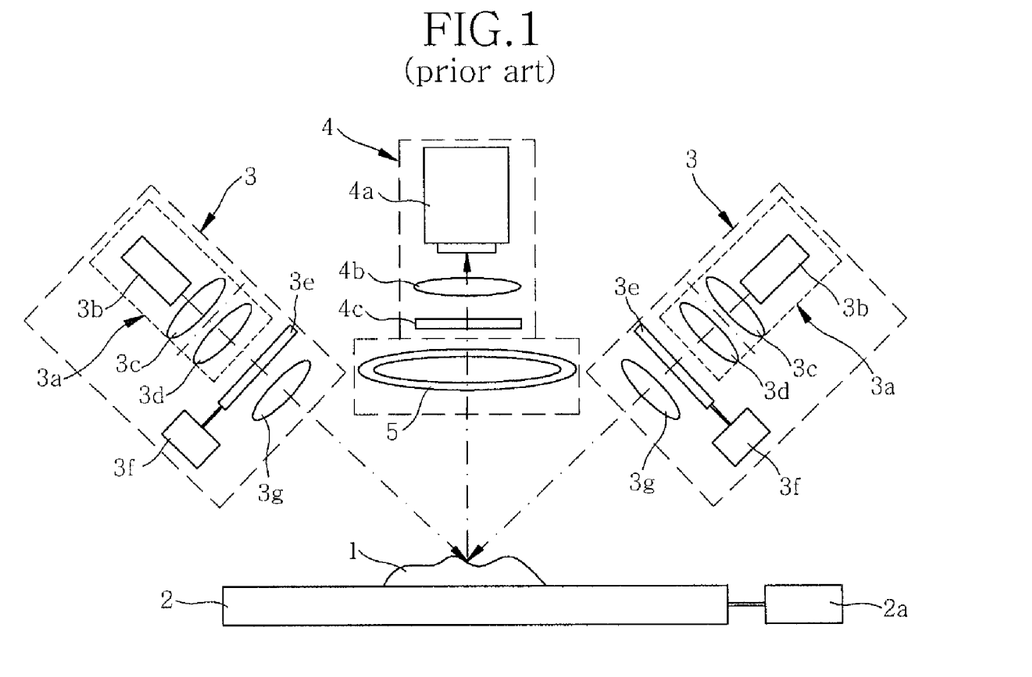
FIG. 1 is a diagram illustrating a conventional projection type moire interferometer.

Hereinafter, a conventional projection type moire interferometer will be described with reference to FIG. 1. As shown in FIG. 1, the conventional moire interferometer includes a plurality of projectors 3 generating a bi-directional pattern illumination and one image formation part 4.

The plurality of projectors 3 is provided to be inclined on one side and another side of the image formation part 3, respectively. The projector 3 includes an illumination part 3a, a grating element 3e, a grating actuator 3f, and an emitting lens 3g to generate the pattern illumination. The illumination part 3a includes an illumination source 3b and a plurality of emitting lenses 3c and 3d. After the illumination that is generated from the illumination source 3b of the illumination part 3a passes through the plurality of emitting lenses 3c and 3d, the pattern illumination is formed via grating patterns formed on the grating element 3e. The pattern illumination according to the grating patterns passes through the emitting lens 3g and is bi-directionally emitted toward a target object 1 placed on an XY table 2. The XY table 2 is actuated by a table actuator 2a to move the target object into either X or Y direction.

The image formation part 4 includes a charge-coupled device (CCD) camera 4a, an imaging lens 4b, and a filter 4c. The image formation part 4 takes a pattern image according to the pattern illumination reflected from the target object 1. Also, a circular lamp 5 is provided below the image formation part 4. The circular lamp 5 is used as an illumination source when taking a particular shape of the target object 1. When an N-bucket algorithm is applied to inspect a 3 dimensional (3D) shape of the target object 1 in a state where the target object 1 is placed on the XY table 2, the image formation part 4 takes N images while moving the grating element 3e via the grating actuator 3f N times. When the N images are taken and obtained, a control unit (not shown) obtains phase information using the obtained images. Also, when the plurality of projectors 3 obtains each phase information, the control unit calculates an integrated phase map in which noise is removed, and inspects a height-map and a 3D shape of the target object 1 using the calculated integrated phase map.

The conventional projection type moire interferometer emits an illumination toward a target object and inspects the target object in a state where a plurality of projectors is provided to face each other based on the target object. In this case, if the target object has a very complex shape, a shadow region may be incompletely removed, which results in inaccurately inspecting the target object.

SUMMARY OF THE INVENTION

To solve the above-described problem in the conventional art, the present invention provides a multi-directional projection type moire interferometer capable of multi-directionally emitting a pattern illumination toward a target object to remove a complex shadow region according to various shapes of the target object, and an inspection method of using the same.

The present invention also provides a multi-directional projection type moire interferometer which can reduce a manufacturing cost since a multi-directional projection type moire interferometer can be constructed in compact by readily changing a projection direction of a pattern illumination via a rotating mirror part to emit an illumination pattern toward a target object, and controlling a movement of a grating board by installing a plurality of grating elements on the grating board.

According to an aspect of the present invention, there is provided a multi-directional projection type moire interferometer including: an XY stage being provided to be movable by a plurality of stage actuators to move a target object into X and Y directions; an image formation part being provided above the XY stage to take a pattern image that is reflected from the target object placed on the XY stage; a first rotating mirror part being provided on one side of the image formation part to receive a pattern illumination, change the optical path of the pattern illumination, and emit the pattern illumination; a second rotating mirror part being provided on another side of the image formation part to receive a pattern illumination, change the optical path of the pattern illumination, and emit the pattern illumination; a plurality of first fixed mirror parts being provided on one side of the first rotating mirror part to emit the pattern illumination, emitted from the first rotating mirror part, toward the target object; a plurality of second fixed mirror parts being provided on another side of the second rotating mirror part to emit the pattern illumination, emitted from the second rotating mirror part, toward the target object; and a first pattern illumination generating part being provided to be capable of emitting the pattern illumination toward the first and the second rotating mirror parts, and generate the pattern illumination.

According to another aspect of the present invention, there is provided an inspection method using a multi-directional projection type moire, the method including: moving a target object to a setup location after adjusting a rotating angle of rotating mirrors of first and second rotating mirror parts, switching on a fifth illumination source, and implementing a secondary inspection of the target object via an image formation part; switching on any one of first through fourth illumination sources when the target object is moved to the setup location; verifying by a central control unit whether the selected illumination source is switched on; moving a grating element corresponding to the selected illumination source by 1/N pitch by moving a grating board when the selected illumination source is switched on; taking, by the image formation part, a pattern image reflected from the target object when the grating element is moved; verifying, by the central control unit, whether the grating element is an Nth pitch movement while acquiring the pattern image; obtaining a phase map using the pattern image taken in each movement when the grating element is moved by the Nth pitch; verifying, by the central control unit, whether first through fourth phase maps are obtained when the phase map is obtained; and inspecting a 3D shape by calculating, by the central control unit, an integrated phase map using the obtained first through the fourth phase maps when the first through the fourth phase maps are obtained, and then calculating an integrated height map using the integrated phase map, wherein nose is removed from the integrated phase map.

BRIEF DESCRIPTION OF THE DRAWINGS

The embodiments will be described in detail with reference to the following drawings in which like reference numerals refer to like elements wherein.

DETAILED DESCRIPTION

First Embodiment

Hereinafter, a first embodiment of a multi-directional projection type moire interferometer according to the present invention will be described with reference to the accompanying drawings.

Figure 2:
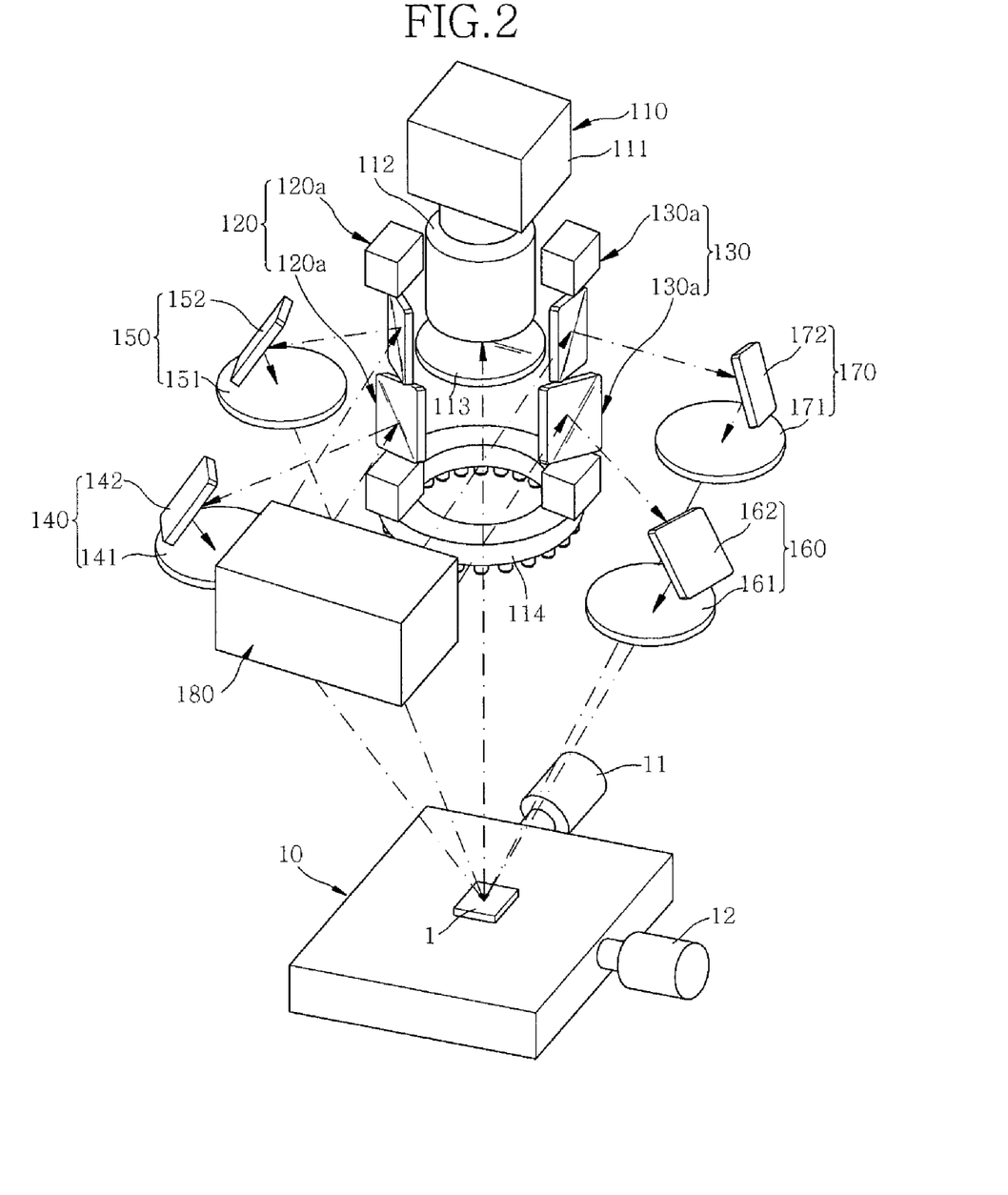
FIG. 2 is a perspective view illustrating a configuration of a multi-directional projection type moire interferometer according to a first embodiment of the present invention.

FIG. 2 is a perspective view illustrating a configuration of a multi-directional projection type moire interferometer according to a first embodiment of the present invention. As shown in FIG. 2, the multi-directional projection type moire interferometer includes an XY stage 10, an image formation part 110, a first rotating mirror part 120, a second rotating mirror part 130, a plurality of first fixed mirror parts 140 and 150, a plurality of second fixed mirror parts 160 and 170, and a first pattern illumination generating part 180. Hereinafter, a process of multi-directionally emitting a pattern illumination toward a target object 1 and thereby inspecting the target object 1 will be sequentially described.

The XY stage 10 is provided to be movable by a plurality of stage actuators 11 and 12 so as to move a target object 1 into X and Y directions.

The image formation part 110 is provided above the XY stage 10 so as to take a pattern image that is reflected from the target object 1 placed on the XY stage 10. The image formation part 110 includes a camera 111, an imaging lens 112, and a first filter 113. Hereinafter, a configuration of each component of the image formation part 110 will be described.

The camera 111 adopts any one of a charge-coupled device (CCD) camera and a complementary metal oxide semiconductor (CMOS) camera to take a pattern image. The imaging lens 112 is provided below the camera 111 to image the pattern image reflected from the target object 1. The first filter 113 is provided below the imaging lens 112 to pass the pattern image reflected from the target object 1. In this instance, the first filter 113 adopts any one of a frequency filter, a color filter, and an optical strength adjustment filter. The image formation part 110 further includes a fifth illumination source 114 in its lower portion to generate illumination for a secondary inspection of the target object 1. The fifth illumination source 114 includes any one of a plurality of luminescent diodes and a domed multi-layered circular lamp.

Figure 4:
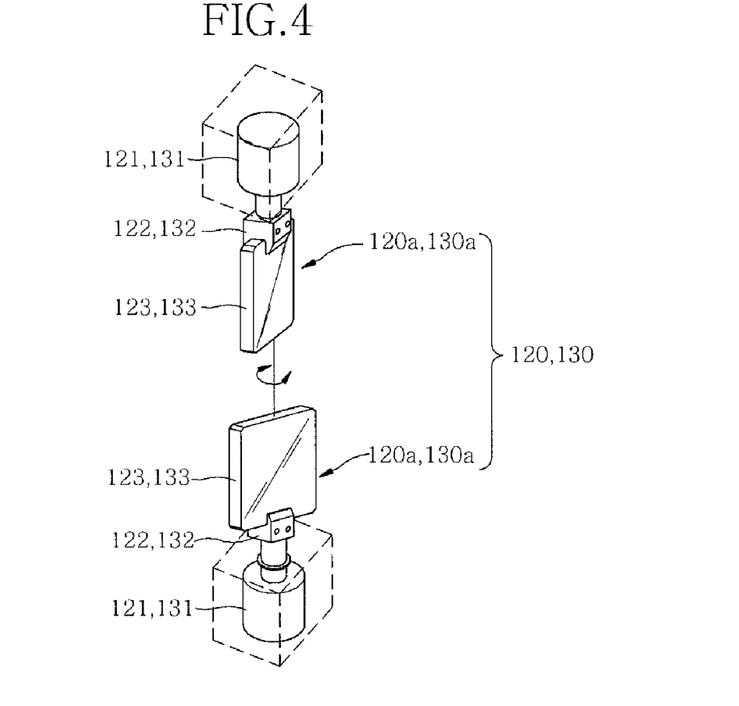
FIG. 4 is a perspective view illustrating a configuration of first and second rotating mirror parts of FIG. 2.

The first rotating mirror part 120 is provided on one side of the image formation part 110 to receive the pattern illumination, change the optical path of the pattern illumination, and emit the pattern illumination. Specifically, the first rotating mirror part 120 changes an incidence angle of the pattern illumination that is emitted toward the target object 1 and thereby emits the pattern illumination. The first and the second rotating mirror parts 120 and 130 change the optical path of the pattern illumination and thereby emit the pattern illumination. As shown in FIG. 4, the first and the second rotating mirror parts 120 and 130 include a plurality of rotating mirror elements 120a and 130a that are arranged in a multi-layer, so that ends of the rotating mirror parts 120a and 130a may vertically face each other, and multi-directionally emit the pattern illumination toward the target object 1.

The plurality of rotating mirror elements 120a and 130a includes mirror rotating instruments 121 and 131, holders 122 and 132, and rotating mirrors 123 and 133, respectively. Hereinafter, the configuration of each component will be described. The mirror rotating instruments 121 and 131 may adopt a motor. As shown in FIG. 4, the mirror rotating instruments 121 and 131 are mounted to one side and another side of the image formation part 110, and the holders 122 and 132 are rotatably provided above the mirror rotating instruments 121 and 131, respectively. The rotating mirrors 123 and 133 are provided on the holders 122 and 132 to be rotatable on the holders 122 and 132 with being supported by the mirror rotating instruments 121 and 131, respectively.

The plurality of first fixed mirror parts 140 and 150 is provided on one side of the first rotating mirror part 120 to emit the pattern illumination, emitted from the first rotating mirror part 120, toward the target object 1. The plurality of second fixed mirror parts 160 and 170 is provided on another side of the second rotating mirror part 130 to emit the pattern illumination, emitted from the second rotating mirror part 130, toward the target object 1.

The plurality of the first and the second fixed mirror parts 140, 150, 160, and 170, emitting the pattern illumination toward the target object 1, includes second filters 141, 151, 161, and 171, and fixed mirrors 142, 152, 162, and 172, respectively. The second filters 141, 151, 161, and 171 receive the pattern illumination emitted from the first and the second rotating mirror parts 120 and 130, and filter and emit the pattern illumination. The fixed mirrors 142, 152, 162, and 172 are inclined with respect to the second filters 141, 151, 161, and 171, respectively, to receive the pattern illumination emitted from the first and the second rotating mirror part, and emit the pattern illumination toward the second filters 141, 151, 161, and 171. When the pattern illumination is emitted toward the target object 1, the second filters 141, 151, 161, and 171 adopt any one of a frequency filter, a color filter, a polarized filter, and an optical strength adjustment filter to filter and emit the pattern illumination.

Figure 3:
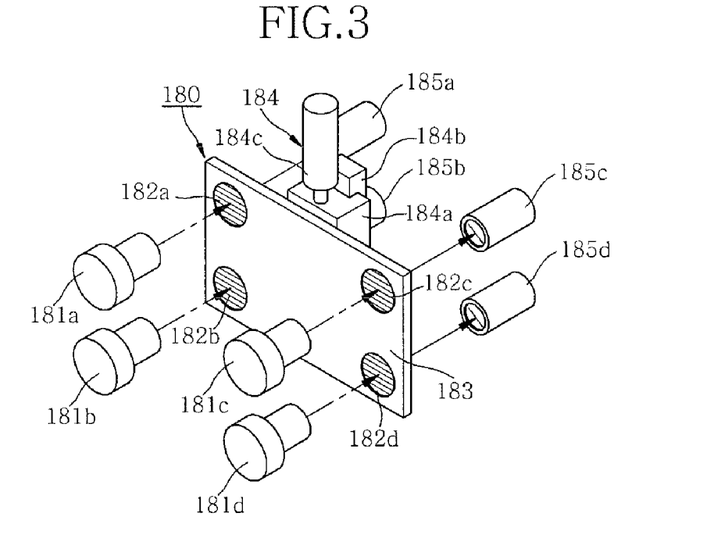
FIG. 3 is a perspective view illustrating a configuration of a first pattern illumination generating part of FIG. 2.

The first pattern illumination generating part 180 is provided to be capable of emitting the pattern illumination toward the first and the second rotating mirror parts 120 and 130. Specifically, the first pattern illumination generating part 180 is provided in front of each of the first and the second mirror rotating parts 120 and 130 so as to emit the pattern illumination toward the rotating mirrors 123 and 133 of the first and the second rotating mirror parts 120 and 130 respectively. As shown in FIG. 3, the first pattern illumination generating part 180, generating the pattern illumination, includes first through fourth illumination sources 181a, 181b, 181c, and 181d, first through fourth grating elements 182a, 182b, 182c, and 182d, a grating board 183, a grating board actuator 184, and a first through fourth emitting lenses 185a, 185b, 185c, and 185d. Hereinafter, the configuration of each component will be described.

The first through the fourth illumination sources 181a, 181b, 181c, and 181d generate the illumination, and are installed on one side surface of the grating board 183. The grating board 183 includes the first through the fourth grating elements 182a, 182b, 182c, and 182d which generate the pattern illumination and emit the generated pattern illumination when the illumination is generated from the first through the fourth illumination sources 181a, 181b, 181c, and 181d. The first through the fourth grating elements 182a, 182b, 182c, and 182d are applied either gratings or liquid crystal devices (not shown), respectively.

The grating board actuator 184 is provided on one side surface of the grating board 183 to vertically move the grating board 183 and thereby vertically move the first through the fourth grating elements 182a, 182b, 182c, and 182d. The grating board actuator 184 includes a linear motion (LM) guide 184a, an LM rail 184b, and an LM actuator 184c. The LM guide 184a is provided on the grating board 183, and the LM rail 184b guides the LM guide 184a. Also, the LM actuator 184c drives the LM guide 184a to move along the LM rail 184b and move the grating board 183. The LM actuator 184c moving the grating board 183 adopts any one of a ball screw, a linear motor, and a PZT actuator. When the PZT actuator is adopted as the LM actuator 184c, the present invention may directly install the grating board 183 in the PZT actuator.

The first through the fourth emitting lenses 185a, 185b, 185c, and 185d are provided on one side surface of the grating board 183 to correspond to the first through the fourth grating elements 182a, 182b, 182c, and 182d so as to emit the pattern illumination that is emitted from the first through the fourth grating elements 182a, 182b, 182c, and 182d.

Figure 5:
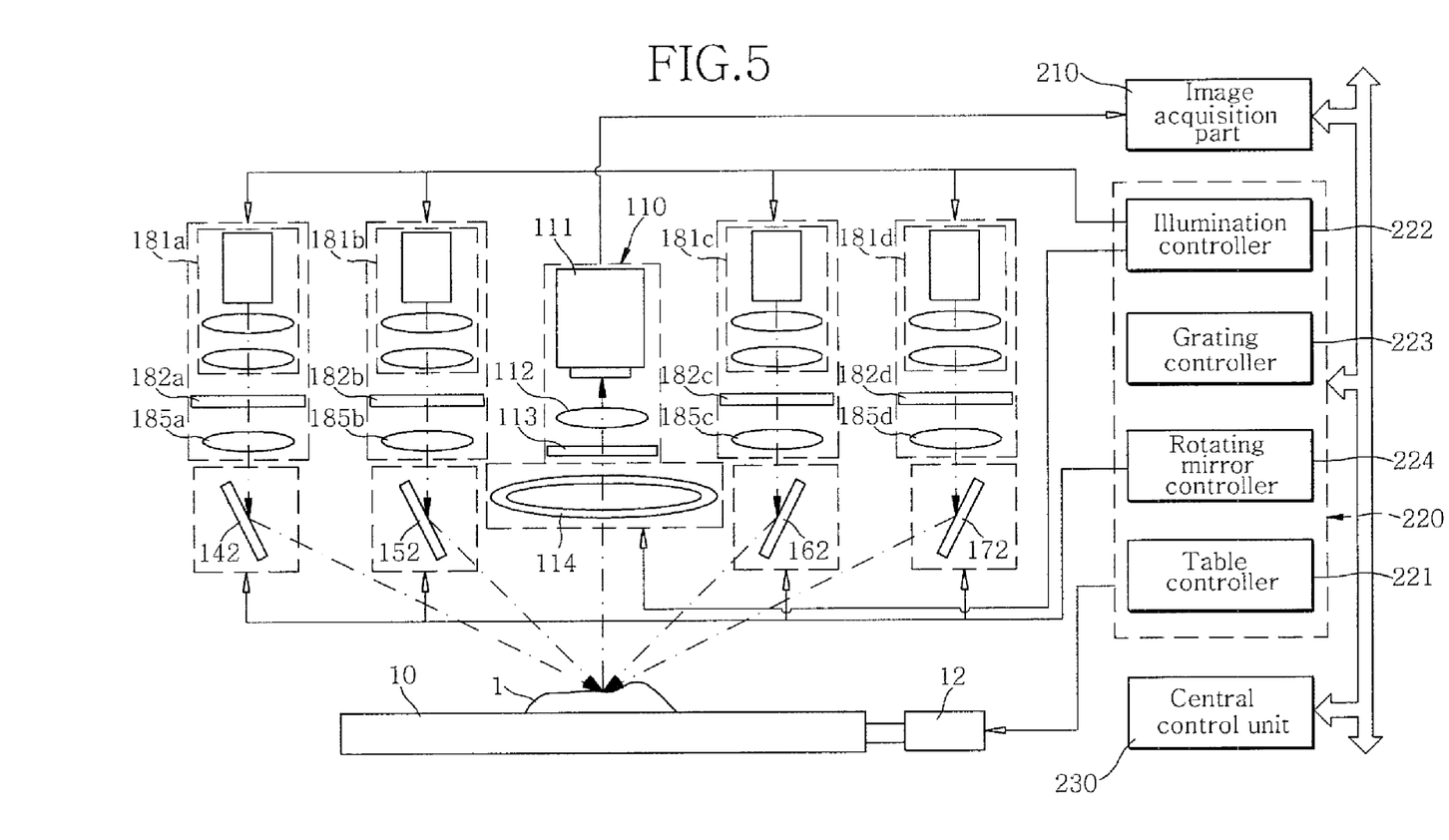
FIG. 5 is a diagram illustrating a configuration of a multi-directional projection type moire interferometer of the present invention.

The above configuration may further include a circuitry to control the multi-directional projection type moire interferometer according to the present invention. As shown in FIG. 5, the circuitry of the multi-directional projection type moire interferometer includes an image acquisition unit 210, a module control unit 220, and a central control unit 230. FIG. 5 is a diagram illustrating a configuration of a multi-directional projection type moire interferometer of the present invention, and schematically shows the multi-directional projection type moire interferometer shown in FIG. 2. Specifically, FIG. 5 schematically shows the multi-directional projection type moire interferometer of FIG. 2 to represent that it is possible to multi-directionally emit the pattern illumination toward the target object 1 based on the image formation part 110 using the first rotating mirror part 120, the second rotating mirror part 130, the plurality of first fixed mirror parts 140 and 150, the plurality of second fixed mirror parts 160 and 170, and the first pattern illumination generating part 180.

As shown in FIG. 5, the image acquisition part 210 receives the pattern image taken by the image formation part 110 and transmits the received pattern image. The module control unit 220 controls the XY stage 10, the first and the second rotating mirror parts 120 and 130, and the first pattern illumination generating part 180, so that the first pattern illumination generating part 180 may generate the pattern illumination, the first and the second rotating mirror parts 120 and 130 rotate and emit the pattern illumination toward the plurality of the first and the second fixed mirror parts 140, 150, 160, and 170, and thereby the pattern illumination is emitted toward the target object being moved by the XY stage 10.

The module control unit 220 controlling the pattern illumination to be emitted toward the target object 1 includes a table controller 221, an illumination controller 222, a grating controller 223, and a rotating mirror controller 224. Hereinafter, the configuration of each component will be described.

The table controller 221 drives a plurality of stage actuators 11 and 12 to move the XY stage 10 toward X and Y directions according to control of the central control unit 230. The illumination controller 222 drives the first pattern illumination generating part 180 to generate the pattern illumination, or driving the fifth illumination source 114 to generate the illumination for the secondary inspection according to control of the central control unit 230. The fifth illumination source 114 is included in the image formation part 110. The grating controller 223 drives the grating board actuator 184 to move the grating board 183 according to control of the central control unit 230. In this instance, the grating board actuator 184 is included in the first pattern illumination generating part 180 and the first through the fourth grating elements 182a, 182b, 182c, and 182d are formed on the grating bard 183. Also, the rotating mirror controller 224 drives the first and the second rotating mirror parts 120 and 130 to receive the pattern illumination emitted from the first pattern illumination generating part 180, change the optical path of the pattern illumination, and emit the pattern illumination according to control of the central control unit 230.

When the optical path of the pattern illumination is changed by driving of the module control unit 220 and the pattern image, which is emitted toward and reflected from the target object 1, is taken by the image formation part 110, and then the taken pattern image is output via the image acquisition part 210, the central control unit 230 receives the output pattern image. The central control unit 230 controls the module control unit 220 to emit the pattern illumination toward the target object 1 that is being moved by the XY stage 10. When the reflected pattern image is taken via the image formation part 10 and is transmitted via the image acquisition part 210, the central control unit 230 acquires a phase map from the pattern image, calculates the height of the target object using the phase map, and inspects a 3D shape of the target object 1.

Second Embodiment

A multi-directional projection type moire interferometer according to the second embodiment will be described with reference to the accompanying drawings.

Figure 6A:
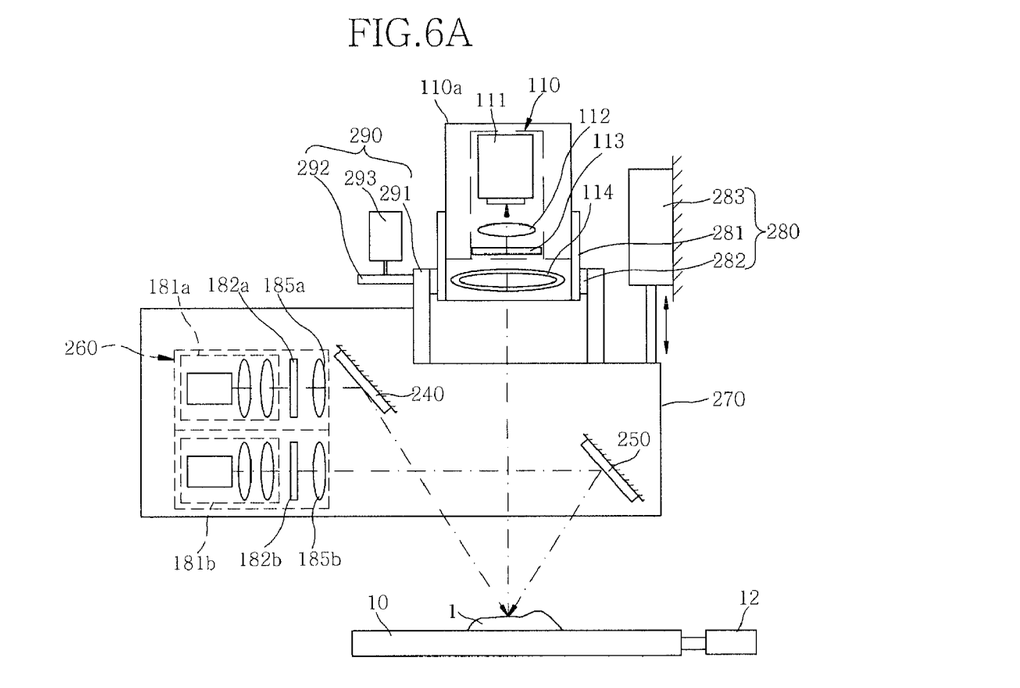
FIGS. 6A and 6B illustrate a configuration of a multi-directional projection type moire interferometer according to a second embodiment of the present invention.
Figure 6B:
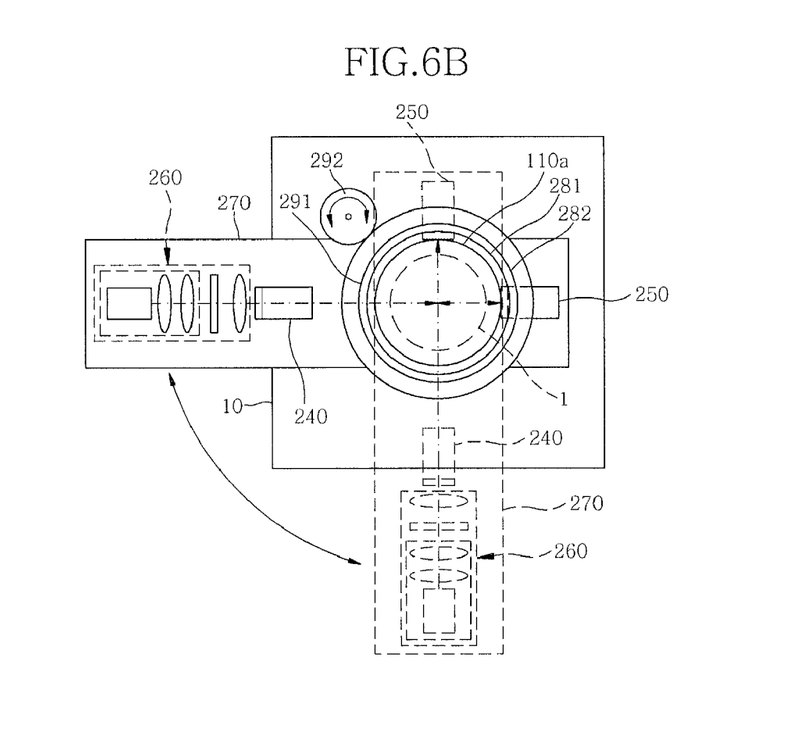

As shown in FIGS. 6A and 6B, the multi-directional projection type moire interferometer according to the second embodiment includes an XY stage 10, an image formation part 110, a first direct reflective mirror 240, a second direct reflective mirror 250, a second pattern illumination generating part 260, a first pattern illumination case 270, a first pattern illumination elevator 280, and a pattern illumination rotating part 290. Hereinafter, the configuration of each component will be described.

The configuration of the above-described XY stage 10 and the image formation part 110 is the same as the XY stage 10 and the image formation part 110 that are applied to the multi-directional projection type moire interferometer according to the first embodiment. The image formation part case 110a is provided outside of the image formation part 110.

The first direct reflective mirror 240 is inclined on one side of the image formation part 110 to emit the pattern illumination toward one side of the target object 1 placed on the XY stage 10 and thereby reflect a pattern image toward the image formation part 110. The second direct reflective mirror 250 is inclined on the other side of the image formation part 110 to be below the first direct reflective mirror 240, to emit the pattern illumination toward another side of the target object 1 paced on the XY stage 10 and thereby reflect the pattern image toward the image formation part 110. The second pattern illumination generating part 260 is provided one side of the first and the second direct reflective mirrors 240 and 250 to generate the pattern illumination and emit the generated pattern illumination toward the first and the second direct reflective mirrors 240 and 250. The first pattern illumination case 270 is formed in a straight type. The first and the second direct reflective mirrors 240 and 250, and the second pattern illumination generating part 260 are contained in the first pattern illumination case 270.

The first pattern illumination elevator 280 is mounted to the image formation part case 110a of the image formation part 110, and includes a motion guide 281, a motion member 282, and a motion instrument 183 to vertically move the first pattern illumination case 270. The motion guide 281 is provided in the image formation part case 110a and the motion member 282 is provided on the motion guide 281 to vertically move along the motion guide 281. Also, the motion instrument 283 is provided on the first pattern illumination case 270 and provides a driving force to vertically move the first pattern illumination case 270. The motion instrument 283 is controlled by a pattern illumination elevator control part (not shown) which controls the first pattern illumination elevator 280, to vertically move the first pattern illumination case 270 and thereby adjust a focal distance according to the target object 1.

The pattern illumination rotating part 290 includes the first pattern illumination case 270 on its one side, and includes the first pattern illumination elevator 280 on its another side. Also, the pattern illumination rotating part 290 includes a rotating member 291, a rotary force transfer member 292, and a motor 293 to rotate the first pattern illumination case 270 into a direction indicated by an arrow of FIG. 6B and thereby multi-directionally emit the pattern illumination, emitted from the second pattern illumination generating part 260, toward the target object 1. The rotating member 291 includes an empty member inside, such as bushing. The inside of the rotating member 291 is mounted to the first pattern illumination elevator 280 and outside thereof is mounted to the first pattern illumination case 270. The rotary force transfer member 292 includes a gear or a belt to transfer to the rotary member 291 the rotary force that is generated from the motor 293. The motor 293 is controlled by a pattern illumination rotation control unit (not shown) to rotate the first pattern illumination case 270 and thereby multi-directionally inspect the target object 1.

Third Embodiment

A multi-directional projection type moire interferometer according to a third embodiment will be described with reference to the accompanying drawings.

Figure 7A:
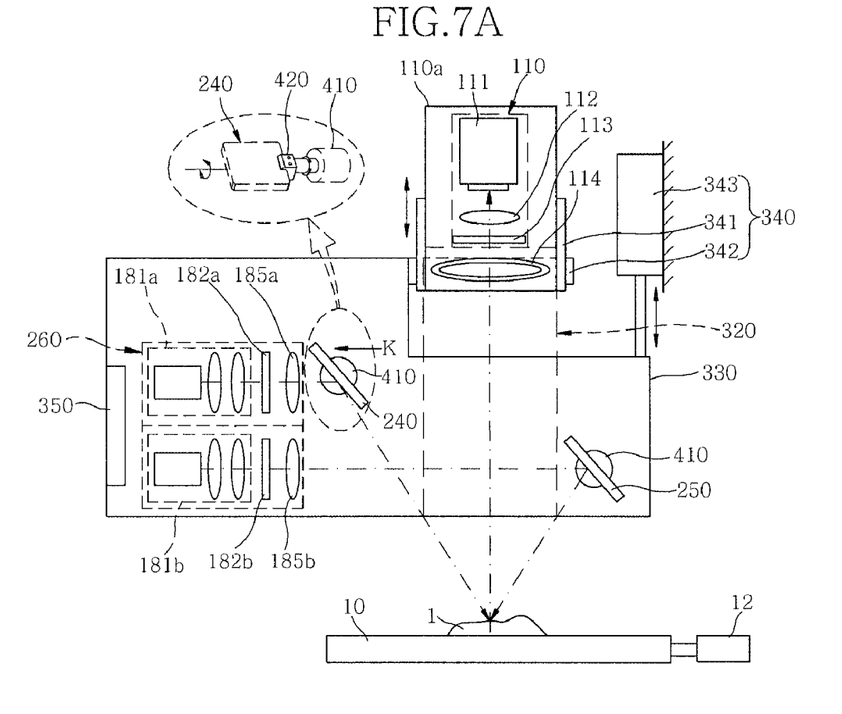
FIGS. 7A and 7B illustrate a configuration of a multi-directional projection type moire interferometer according to a third embodiment of the present invention.
Figure 7B:
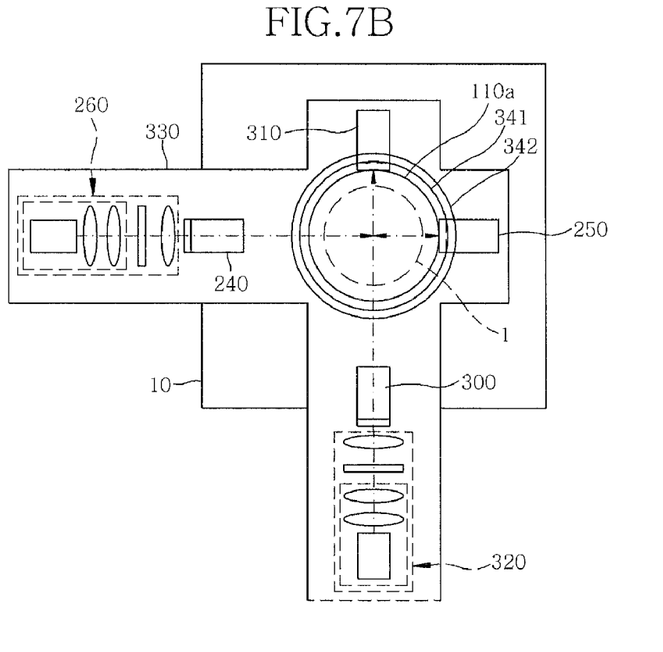

As shown in FIGS. 7A and 7B, the multi-directional projection type moire interferometer according to the third embodiment includes an XY stage 10, an image formation part 110, a first direct reflective mirror 240, a second direct reflective mirror 250, a second pattern illumination generating part 260, a third direct reflective mirror 300, a fourth direct reflective mirror 310, a third pattern illumination generating part 320, a second pattern illumination case 330, and a second pattern illumination elevator 340. Hereinafter, a configuration of each component will be described with reference to FIGS. 7A and 7B.

In the multi-directional projection type moire interferometer according to the third embodiment, the configuration of the XY stage 10, the image formation part 110, the first direct reflective mirror 240, the second direct reflective mirror 250, and the second pattern illumination generating part 260 are the same as the multi-direction projection type moire interferometer according to the second embodiment, and thus further detailed descriptions will be omitted. In this instance, in addition to the first direct reflective mirror 240 which emits the pattern illumination toward one side of the target object 1 in one direction and the second direct reflective mirror 250 which emits the pattern illumination toward another side of the target object in one direction, the multi-directional projection type moire interferometer according to the third embodiment further includes the third direct reflective mirror 300, the fourth direct reflective mirror 310, the third pattern illumination generating part 320, the second pattern illumination case 330, and the second pattern illumination elevator 340 so as to multi-directionally inspect the target object 1 without rotating the second pattern illumination generating part 260.

The third direct reflective mirror 300 is provided at the same height as the first direct reflective mirror 240 to be orthogonal to the first direct reflective mirror, to emit the pattern illumination toward one side of the target object 1 placed on the XY stage 10 in another direction and thereby reflect the pattern image toward the image formation part 110. The fourth direct reflective mirror 310 is provided at the same height as the second direct reflective mirror 250 to be orthogonal to the second direct reflective mirror 250, to emit the pattern illumination toward another side of the target object 1 placed on the XY stage 10 in another direction and thereby reflect the pattern image toward the image formation part 110. As described above, the third and the fourth direct reflective mirrors 300 and 310 emit the pattern illumination toward one side and another side of the target object 1 placed on the XY stage 10, in another direction. Also, the first and the second direct reflective mirrors 240 and 250 emit the pattern illumination toward one side and another side of the target object 1, placed on the XY stage, in one direction. Therefore, it is possible to multi-directionally emit the pattern illumination via the first through the fourth direct reflective mirrors 240, 250, 300, and 310. In this instance, the other direction designates a direction that is different from the one direction based on the target object 1, for example, a direction that is orthogonal to the one direction. The third pattern illumination generating part 320 is provided on one side of the third and the fourth direct reflective mirrors 300 and 310 so as to generate the pattern illumination toward the third and the fourth direct reflective mirrors 300 and 310. The second pattern illumination case 330 is formed in a cross type, and includes the first through the fourth direct reflective mirrors 240, 250, 300, and 310, and the second and the third pattern illumination generating parts 260 and 320.

The second pattern illumination elevator 340 includes a motion guide which is provided on the image formation part case 110a of the image formation part 110 and vertically moves the second pattern illumination case 330, a motion member 342, and a motion instrument 343. The configuration and operation of each component is the same as the motion guide 281, the motion member 282, and the motion instrument 283 of the first pattern illumination elevator 280, and thus will be omitted. In this instance, the second pattern illumination case 330 is provided on one side surface of the motion member 342 and the motion guide 341 is provided on another side surface of the motion member 342. Therefore, the motion member 342 is vertically moved along the motion guide 341.

The first through the fourth direct reflective mirrors 240, 250, 300, and 310, which are applied to the multi-directional projection type moire interferometer according to the second and the third embodiments, may be fixed like the first and the second direct reflective mirrors 240 and 250 of FIG. 6A. Also, like the first and the second direct reflective mirrors of FIG. 7A, the first through the fourth direct reflective mirrors 240, 250, 300, and 310 may be rotated to change the optical path of the pattern illumination, that is, to adjust the incidence angle of the pattern illumination that is emitted toward the target object 1.

To adjust the incidence angle of the pattern illumination, the first through the fourth direct reflective mirrors 240, 250, 300, and 310 may further include a mirror rotating instrument 410 and a holder 420 like the first direct reflective mirror 240 of FIG. 7A. The first direct reflective mirror 240 indicated by a dotted line of FIG. 7A is when the first direct reflective mirror 240 installed in the second pattern illumination case 330 of FIG. 7A is viewed from a direction K, and is given to more concisely describe the configuration of the mirror rotating instrument 410 and the holder 420. The mirror rotating instrument 410 included in the first through the fourth direct reflective mirrors 240, 250, 300, and 310 generates the rotary force to rotate the first through the fourth direct reflective mirrors 240, 250, 300, and 310. The holder 420 is mounted to the mirror rotating instrument 410 to support the first through the fourth direct reflective mirrors 240, 250, 300, and 310.

Figure 8:
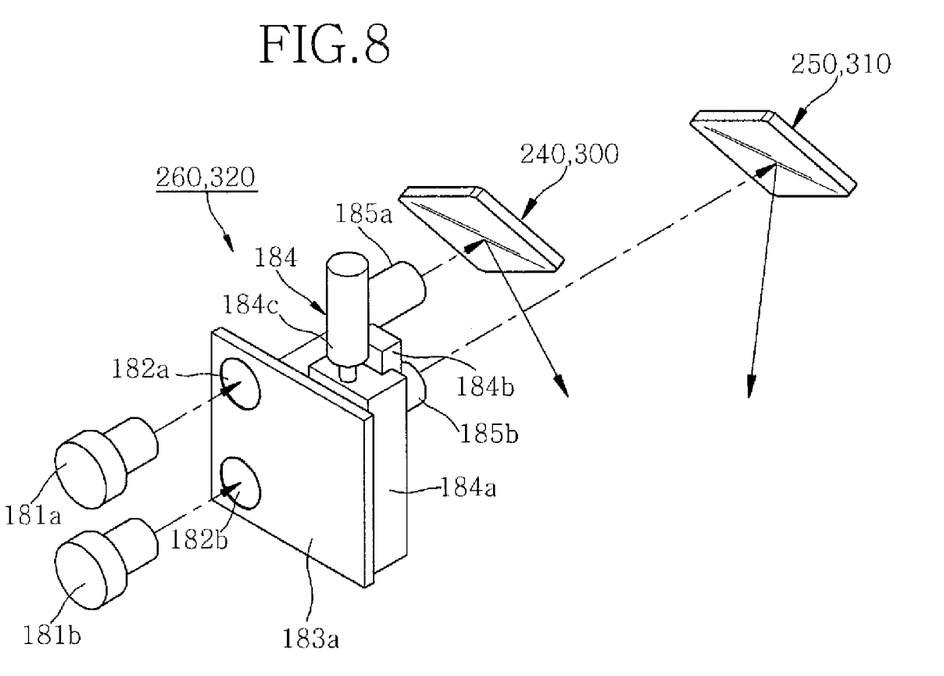
FIG. 8 is a perspective illustrating a configuration of second and third pattern illumination generating parts in detail shown in FIGS. 6A and 7A respectively.

As shown in FIG. 8, the second and the third pattern illumination generating parts 260 and 320, which are applied to the multi-directional projection type moire interferometer according to the second and the third embodiments, may include first and second illumination sources 181a and 181b, first and second grating elements 182a and 182b, a grating board 183a, a grating board actuator 184, and first and second emitting lenses 185a and 185b so as to generate the pattern illumination and emit the generated pattern illumination. The configuration and operation of each component is the same as the first pattern illumination part 180 of FIG. 3 which is applied to the multi-directional projection type moire interferometer according to the first embodiment, and thus further descriptions will be omitted here. The pattern illumination emitted from the first and the second emitting lenses 185a and 185b is emitted toward the first and the second direct reflective mirrors 240 and 250, respectively, or is emitted to the third and the fourth direct reflective mirrors 300 and 310, respectively. Also, the grating board 183a includes two, i.e. the first and the second grating elements 182a and 182b, whereas the grating board 183 of FIG. 3, which is applied to the multi-directional projection type moire interferometer according to the first embodiment, includes the first through the fourth grating elements 182a, 182b, 182c, and 182d of FIG. 3, which is different.

As shown in FIG. 7A, a cooler 350 that is applied to the multi-directional projection type moire interferometer according to the second and the third embodiments may be further provided on one side of the second and the third pattern illumination generating parts 260 and 320 so as to remove the heat generated from the first and the second illumination sources 181a and 181b of the second and the third pattern illumination generating parts 260 and 320. The cooler 350 adopts any one of a cooling fan, a thermoelectric element, and a hit sink member to remove the heat generated from the second and the third pattern illumination generating parts 260 and 320.

Figure 9:
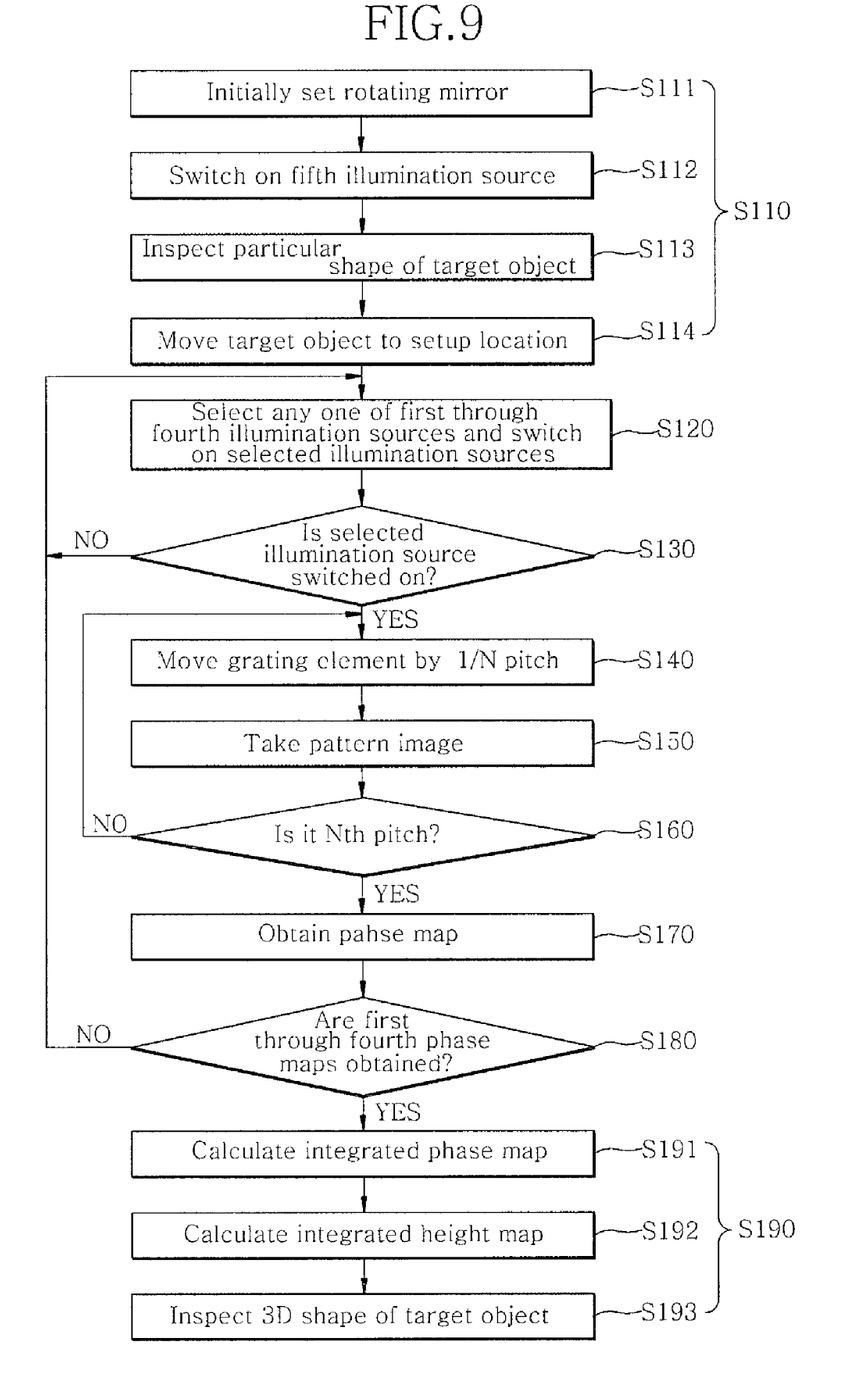
FIG. 9 is a flowchart illustrating an inspection method using a multi-directional projection type moire interferometer of the present invention.

An inspection method using the multi-directional projection type moire interferometer constructed as above will be described with reference to FIGS. 2, 5, and 9.

In operation S110, the inspection method moves the target object 1 to a setup location via the XY stage 10 after adjusting a rotating angle of the rotating mirrors 123 and 133 of the first and second rotating mirror parts 120 and 130, switching on the fifth illumination source 114, and implementing a secondary inspection of the target object 1 via the image formation part 110.

Operation S110 of moving the target object 1 to the setup location includes operation S111 of rotating and thereby initially setting the rotating mirrors 123 and 133 of the first and the second rotating mirror parts 120 and 130 so as to multi-directionally emit the pattern illumination toward the target object 1, operation S112 of switching on the fifth illumination source 114 when the initial setup of the rotating mirrors 123 and 133 is completed, operation S113 of taking the target object 1 via the image formation part 110 and thereby inspecting a particular shape of the target object 1, and operation S114 of moving the target object 1 to the setup location when the secondary inspection is completed.

In operation S120, when the target object 1 is moved to the setup location, the inspection method switches on any one of the first through the fourth illumination sources 181a, 181b, 181c, and 181d. In operation S130, the central control unit 230 verifies whether the selected illumination source is switched on. For example, when the first through the fourth illumination sources 181a, 181b, 181c, and 181d are sequentially switched on/off, the central control unit 230 verifies whether the first illumination source 181a is switched on.

Operation S130 of verifying, by the central control unit 230, whether the selected illumination source is switched on returns to operation S120 of switching on any one of the fourth illumination sources 181a, 181b, 181c, and 181d when the selected illumination source is not switched on by verifying whether the fourth illumination sources 181a, 181b, 181c, and 181d are sequentially selected and switched on or off. Conversely, when the selected illumination source is switched on, the inspection method moves a grating element corresponding to the selected illumination source by 1/N pitch by moving the grating board 183 when the selected illumination source is switched on in operation S140. For example, when the first illumination source 181a is switched on, the inspection method moves the first grating element 182a corresponding to the selected first illumination source 181a by 1/N pitch.

In operation S150, when the grating element is moved, the image formation part 110 takes a pattern image reflected from the target object 1. In operation S160, the central control unit 230 verifies whether the grating element is an Nth pitch movement while acquiring the pattern image. Operation S160 of verifying whether the grating element is the Nth pitch movement is to utilize an N bucket algorithm when inspecting a 3D shape of the target object 1. Operation S160 of verifying, by the central control unit 230, whether the grating element is the Nth pitch movement returns to operation S140 of moving the grating element corresponding to the selected illumination source by 1/N pitch when the Nth pitch movement of the grating element is unfinished. Conversely, when the grating element is the Nth pitch movement, the inspection method obtains a phase map using the pattern image taken in each movement in operation S170.

In operation S180, when the phase map is obtained, the central control unit 230 verifies whether first through fourth phase maps are obtained. For example, when the pattern image is taken via the first illumination source 181a and the first grating element 182a and thereby the phase map is obtained, the central control unit 230 stores the obtained phase map as a first phase map. Next, while sequentially switching on/off the second through the fourth illumination sources 181b, 181c, and 181d after switching off the first illumination source 181a, the central control unit 230 obtains second through fourth phase maps according thereto, and emits the pattern illumination toward the multi-directions of the target object 1. Next, the central control unit 230 takes a pattern image reflected from the target object 1, obtains the first through the fourth phase maps, and verifies the result thereof. In this instance, operation S180 of verifying, by the central control unit 230, whether the first through the fourth phase maps are obtained returns to operation S120 of switching on any one of the first through the fourth illumination sources 181a, 181b, 181c, and 181d to obtain the first through the fourth phase maps when all the first through the fourth phase maps are not obtained. Conversely, when the first through the fourth phase maps are obtained, the central control unit 230 calculates an integrated phase map in which noise is removed using the obtained first through the fourth phase maps, and calculates an integrated height map using the integrated phase map, and thereby inspects a 3D shape of the target object.

Operation S190 of inspecting the 3D shape of the target object 1 includes operation S191 of calculating, by the central control unit 230, the integrated phase map in which noise is removed using the first through the fourth phase maps when the first through the fourth phase maps are obtained, operation S192 of calculating, by the central control unit 230, the integrated height map using the calculated integrated phase map, and operation S193 of inspecting, by the central control unit 230, the 3D shape of the target object 1 using the calculated integrated height map.

A multi-directional projection type moire interferometer and an inspection method using the same according to the present invention may remove a complex shadow region according to various types of shapes of a target object. Also, since the multi-directional projection type moire interferometer can be constructed in compact by readily changing a projection direction of a pattern illumination via a rotating mirror part to emit an illumination pattern toward a target object, and controlling a movement of a grating board by installing a plurality of grating elements on the grating board, a manufacturing cost can be reduced.

What is claimed is:

1. A multi-directional projection type moire interferometer comprising:
    a stage for moving a target object;
    an image formation part above the stage for taking a pattern image that is reflected from the target object placed on the stage;
    a first rotating mirror and a second rotating mirror that can each be rotated about vertical axes of respective holders to receive a pattern illumination, change the optical path of the pattern illumination, and emit the pattern illumination;
    a first fixed mirror and a second fixed mirror for emitting the pattern illumination emitted from the first and the second rotating mirrors, toward the target object; and
    a first pattern illumination generating part for emitting the pattern illumination toward the first and the second rotating mirrors and generate the pattern illumination, the first pattern illumination generating part comprising:
        a grating board;
        at least one illumination source generating illumination and installed at one side of the grating board; and
        first and second grating elements formed in the grating board and respectively generating the pattern illumination emitted towards the first and second rotating mirrors when illumination from the at least one illumination source passes through the grating elements.

2. The interferometer of claim 1, wherein the image formation part comprises:
    a camera taking the pattern image; and
    an imaging lens being provided below the camera to concentrate the pattern image reflected from the target object;
    wherein the camera is any one of a charge-coupled device (CCD) camera and a complementary metal oxide semiconductor (CMOS) camera.

3. The interferometer of claim 1, wherein the image formation part further comprises:
    a secondary illumination source generating illumination for an inspection of the target object,
    wherein the illumination source includes any one of a plurality of luminescent diodes and a domed circular lamp.

4. The interferometer of claim 1, further comprising:
    a first filter receiving the pattern illumination that is emitted from the first rotating mirror, filtering the received pattern illumination, and emitting the filtered pattern illumination; and
    a second filter receiving the pattern illumination that is emitted from the second rotating mirror, filtering the received pattern illumination, and emitting the filtered pattern illumination,
    wherein each of the first and second filters is any one of a frequency filter, a color filter, a polarized filter, and an optical strength adjustment filter.

5. The interferometer of claim 1, wherein the first pattern illumination generating part further comprises:
    a grating board actuator for moving the grating board,
    wherein the at least one illumination source comprises first and second illumination sources generating illumination.

6. The interferometer of claim 5, wherein the first pattern illumination generating part further comprises:
    third and fourth illumination sources generating illumination; and
    third and fourth grating elements formed in the grating board and respectively generating pattern illumination when illumination from the third and fourth illumination sources passes through the third and fourth grating elements.

7. The interferometer of claim 5, wherein the grating board actuator comprises:
    a linear motion (LM) guide being provided on the grating board;
    an LM rail guiding the LM guide; and
    an LM actuator driving the LM guide to move along the LM rail and move the grating board,
    wherein the LM actuator adopts any one of a ball screw, a linear motor, a piezo electric (PZT) actuator.

8. The interferometer of claim 1, further comprising:
an image acquisition unit receiving the pattern image taken by the image formation part and transmitting the received pattern image;
a central control unit acquiring a phase map of the target object from the pattern image, calculating the height of the target object using the phase map, and inspecting a 3-dimensional (3D) shape of the target object.

9. The interferometer of claim 8, further comprising a module control unit that comprises:
a table controller driving a plurality of stage actuators to move the stage in X and Y directions according to control of the central control unit;
an illumination controller driving the first pattern illumination generating part to generate the pattern illumination, or driving a secondary illumination source to generate the illumination for an inspection according to control of the central control unit, wherein the secondary illumination source is included in the image formation part;
a grating controller driving a grating board actuator to move the grating board according to control of the central control unit; and
a rotating mirror controller driving actuators rotating the first and the second rotating mirrors to receive the pattern illumination emitted from the first pattern illumination generating part, change the optical path of the pattern illumination, and emit the pattern illumination.

10. A multi-directional projection type moire interferometer comprising:
a stage for moving a target object;
an image formation part above the stage to take a pattern image reflected from the target object placed on the stage;
a first direct reflective mirror being inclined on one side of the image formation part to emit a first pattern illumination toward one side of the target object placed on the stage in one direction and thereby reflect a pattern image toward the image formation part;
a second direct reflective mirror being inclined on the other side of the image formation part to be below the first direct reflective mirror, to emit a second pattern illumination toward another side of the target object placed on the stage in one direction and thereby reflect a pattern image toward the image formation part;
a pattern illumination generating part being provided on one side of the first and the second direct reflective mirrors to generate the first and second pattern illuminations and emit the generated first and second pattern illuminations toward the first and the second direct reflective mirrors;
a pattern illumination case containing the first and the second direct reflective mirrors and the pattern illumination generating part;
a pattern illumination elevator being mounted to an image formation part case of the image formation part to vertically move the pattern illumination case; and
a pattern illumination rotating part including the pattern illumination case on its one side and including the pattern illumination elevator on its another side, to rotate the pattern illumination case so as to multi-directionally emit the first and second pattern illuminations, emitted from the pattern illumination generating part, toward the target object, wherein the pattern illumination generating part comprises:
first and second illumination sources generating illumination;
a grating board comprising first and second grating elements which are provided on one side of the first and the second illumination sources respectively to generate the first and second pattern illuminations and emit the generated first and second pattern illuminations when the illuminations are generated from the first and second illumination sources;
a grating board actuator provided to vertically move the first and the second grating elements and thereby vertically move the grating board; and
first and second emitting lenses provided on the grating board to emit the first and second pattern illuminations when the first and second pattern illuminations are emitted from the first and the second grating elements.

11. A multi-directional projection type moire interferometer comprising:
a stage for moving a target object;
an image formation part being provided above the stage to include an image formation part case on its external surface and take a pattern image reflected from the target object placed on the stage;
a first direct reflective mirror being inclined on one side of the image formation part to emit a first pattern illumination toward one side of the target object placed on the stage in one direction and reflect a pattern image toward the image formation part;
a second direct reflective mirror being inclined on the other side of the image formation part in a higher portion or a lower portion of the first direct reflective mirror to emit a second pattern illumination towards another side of the target object placed on the stage in one direction, and reflect the pattern image toward the image formation part;
a third direct reflective mirror being provided at the same height as the first direct reflective mirror to be orthogonal to the first direct reflective mirror, to emit a third pattern illumination toward one side of the target object placed on the stage and reflect the pattern image toward the image formation part;
a fourth direct reflective mirror being provided at the same height as the second direct reflective mirror to be orthogonal to the second direct reflective mirror, to emit a fourth pattern illumination toward another side of the target object placed on the stage and reflect the pattern image toward the image formation part;
a first pattern illumination generating part being provided on one side of the first and the second direct reflective mirrors to generate the first and second pattern illuminations and emit the generated first and second pattern illuminations toward the first and the second direct reflective mirrors, respectively;
a second pattern illumination generating part being provided on one side of the third and the fourth direct reflective mirrors to generate the third and fourth pattern illuminations and emit the generated third and fourth pattern illuminations toward the third and the fourth direct reflective mirrors, respectively;
a pattern illumination case containing the first through the fourth direct reflective mirrors, and the first and second pattern illumination generating parts; and a pattern illumination elevator being mounted to an image formation part case of the image formation part to vertically move the pattern illumination case, wherein the first pattern illumination generating part comprises:

first and second illumination sources generating illuminations;

a grating board comprising first and second grating elements which are provided on one side of the first and the second illumination sources respectively to generate the first and second pattern illuminations and emit the generated first and second pattern illuminations when the illuminations are generated from the first and the second illumination sources;

a grating board actuator being provided to vertically move the first and the second grating elements and thereby vertically move the grating board; and first and second emitting lenses being provided on the grating board to emit the first and second pattern illuminations when the first and second pattern illuminations are emitted from the first and second grating elements.

12. An inspection method using a multi-directional projection type moire, the method comprising:

moving a target object to a setup location using a movable stage;

rotating one of a first and a second rotating mirror, wherein the first and second rotating mirrors are mounted on vertical axes of holders and each rotating mirror can be rotated about the vertical axis of the holder to be inclined at angles different from each other;

moving a grating board comprising first and second grating elements respectively provided on one side of first and second illumination sources to generate a pattern illumination and emit the generated pattern illumination toward the first and second rotating mirrors, wherein the grating board is moved by 1/N times a pitch of the first and second grating elements, wherein N is an integer;

switching on one of the first and second illumination sources, wherein the illumination source that is switched on corresponds to the rotating mirror that is rotated;

taking, using an image formation part, a pattern image reflected from the target object;

verifying, using a central control unit, whether the one of the first and second grating elements corresponding to the rotated mirror is moved by 1/N times the pitch while acquiring the pattern image;

obtaining at least two phase maps using the pattern image taken in each movement of the grating element corresponding to the rotated mirror when the grating element is moved by the Nth pitch; and inspecting a 3D shape of the target object by calculating, by the central control unit, an integrated phase map using the obtained phase maps, and then calculating an integrated height map using the integrated phase map, wherein noise is removed from the integrated phase map.

* * * * *